United States Patent [19]

Weldon et al.

[11] Patent Number: 5,038,611
[45] Date of Patent: Aug. 13, 1991

[54] APPARATUS AND METHOD FOR PROVIDING A TEMPERATURE COMPENSATED LIQUID LEVEL MEASUREMENT

[75] Inventors: Thomas P. Weldon, Pleasant Hills; James L. McShane, Churchill Boro, both of Pa.

[73] Assignee: Westinghouse Electric Corp., Pittsburgh, Pa.

[21] Appl. No.: 453,736

[22] Filed: Dec. 20, 1989

[51] Int. Cl.$^5$ ..................... G01F 23/28; G01N 9/00
[52] U.S. Cl. ................... 73/290 V; 364/582; 377/25
[58] Field of Search ............ 73/290 V, 32 A; 364/509

[56] References Cited

U.S. PATENT DOCUMENTS

| | | |
|---|---|---|
| 3,845,288 | 10/1974 | Cornyn, Jr. et al. ............ 364/582 |
| 4,303,984 | 12/1981 | Houvig ...................... 364/571.07 |
| 4,359,902 | 11/1982 | Lawless ......................... 73/290 R |
| 4,815,323 | 3/1989 | Ellinger et al. ............... 364/509 X |

Primary Examiner—Daniel M. Yasich

[57] ABSTRACT

A system for providing a temperature compensated measurement indicative of the height of a fluid in a vessel includes an acoustic waveguide in fluid communication with the vessel. A reference target is positioned within the waveguide. Ultrasonic signals are produced in the fluid and a timer measures a first transit time representative of the time for the ultrasonic signals to travel to and from the target and a second transit time representative of the time for the ultrasonic signals to travel to and from the surface of a fluid in the waveguide. A circuit calculates the height of the fluid in the waveguide from the first and second transit times. Another circuit determines the density of the fluid in the waveguide from the first transit time and normalizes the calculated height of the fluid based on the density of the fluid such that the normalized height is indicative of the height of the fluid in the vessel.

22 Claims, 4 Drawing Sheets

APPARATUS AND METHOD FOR PROVIDING A TEMPERATURE COMPENSATED LIQUID LEVEL MEASUREMENT

BACKGROUND OF THE INVENTION

1. Field of the Invention

The present invention is directed generally to measurement systems and more particularly to measurement systems using ultrasonic signals.

2. Description of the Prior Art

The measurement of fluid levels in tanks, pressure vessels, boilers, and the like (hereinafter referred to as vessels) is essential for control purposes, maintaining inventories, and insuring safety. Many techniques are available for measuring fluid levels including sight glasses, float switches, and differential pressure monitors. Acoustic measuring systems, which have gained some acceptance in fields such as photography, have also been adapted for measuring fluid levels in vessels. In currently used systems, acoustic waves are typically propagated through air or other gas using transducers mounted above the liquid surface. An acoustic wave propagating in an extended medium attenuates at a rate which is inversely proportional to the square of the distance from the source of the wave. That attenuation greatly limits the useful measurement range and therefore presents a significant drawback in adapting such technology to the measurement of fluid levels in large vessels.

Often the measurement of the fluid level in a standpipe, which is in fluid communication with the vessel through taps carried by the vessel, can provide an indication of the level of fluid in the vessel. However, a problem arises in that the height of the fluid in the standpipe $H_s$ may be less than the height of the fluid in the vessel $H_v$. That can arise when heat is being added to the vessel but the standpipe is not maintained at the same temperature due to heat loss to the environment. That difference in temperature between the vessel and the standpipe results in a difference in density between the fluid in the vessel and the fluid in the standpipe. Because the fluid in the standpipe has a different density than does the fluid in the vessel, the level of fluid in the standpipe $H_s$ is not the same as the level of fluid in the vessel $H_v$.

The difference between the fluid level in a boiler and the fluid level in the boiler's standpipe $H_v - H_s$ is shown in FIG. 1 as a function of the height H between the taps. Three curves are shown which represent three different operating temperatures and pressures. As can be seen from the figure, as the volume of fluid in the boiler increases, and as operating temperatures and pressures increase, the difference between the two levels increases.

To compensate for such level differences, some sight glasses are fitted with thermometers so that operators not only see the fluid level, but they can also read the temperature of the fluid. Based on the temperature reading and the operator's experience, the operator then determines how much higher the vessel's fluid level must be. Clearly, such a system is heavily dependent on the experience level of the operator and costly mistakes can easily be made. Thus, the need exists for a system which can provide a temperature compensated measurement which is indicative of the height of the fluid in a vessel and which is more easily understood by operators.

SUMMARY OF THE PRESENT INVENTION

The present invention is directed to a system for providing a temperature compensated measurement indicative of the height of a fluid in a vessel which includes an acoustic waveguide in fluid communication with the vessel. A reference target is positioned within the waveguide. Ultrasonic signals are produced and a timer measures a first transit time representative of the time for the ultrasonic signals to travel to and from the target and a second transit time representative of the time for the ultrasonic signals to travel to and from the surface of a fluid in the waveguide. A first circuit calculates the height of the fluid in the waveguide from the first and second transit times. A second circuit determines the density of the fluid in the waveguide from the first transit time and normalizes the calculated height of the fluid based on the density of the fluid such that the normalized height is indicative of the elevation head of the fluid in the vessel.

According to one embodiment of the invention, the waveguide is a standpipe located outside the vessel and is in fluid communication with the vessel through taps carried by the vessel. According to another embodiment of the invention, the waveguide is located inside the vessel.

According to one embodiment of the invention, the height of the fluid is derived from the ratio of the first and second transit times.

According to another embodiment of the invention, the velocity of the ultrasonic signals is derived from the first transit time. That velocity can be used to determine the density of the fluid through the use of tables or by evaluating an equation which expresses density as a function of propagation velocity in the fluid.

According to another embodiment of the invention, the second circuit normalizes the calculated height by expressing the calculated height in standardized engineering units of elevation head.

According to another embodiment of the invention, condensation fins, insulation, and reservoirs are used to maintain the temperature of the fluid in the waveguide constant.

The present invention uses an ultrasonic transducer which may act as both an ultrasonic transmitter and receiver and may also use separate transducers for transmitting and receiving. The present invention discloses several transmitter/receiver mounting orientations.

The present invention is also directed to a method for measuring the height of a fluid in a vessel, comprising the steps of: providing a waveguide in fluid communication with the vessel; positioning a reference target within the waveguide; producing ultrasonic signals; measuring a first transit time representative of the time for the ultrasonic signals to travel to and from the target; measuring a second transit time representative of the time for the ultrasonic signals to travel to and from the surface of a fluid in the waveguide; calculating the height of the fluid in the waveguide from the first and second transit times; determining the density of the fluid in the waveguide from the first transit time; and normalizing the calculated height of the fluid based on the density of the fluid such that the normalized height is indicative of the height of the fluid in the vessel at a preferred reference temperature.

Because the present invention uses an acoustic waveguide, attenuation is substantially reduced. Experiments have demonstrated the ability to measure water level up to hundreds of feet. An advantage of the invention is that low signal power can be used to measure large distances because the acoustic energy is confined. Thus measurements can be made in very large tanks, vessels, reservoirs, etc. with a high degree of precision. Another advantage of a waveguide is that a useful surface reflection can be obtained even though the waveguide axis is not perfectly vertical. Those and other advantages and benefits of the present invention will become apparent from the Description of a Preferred Embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DESCRIPTION OF A PREFERRED EMBODIMENT

Figure 1:
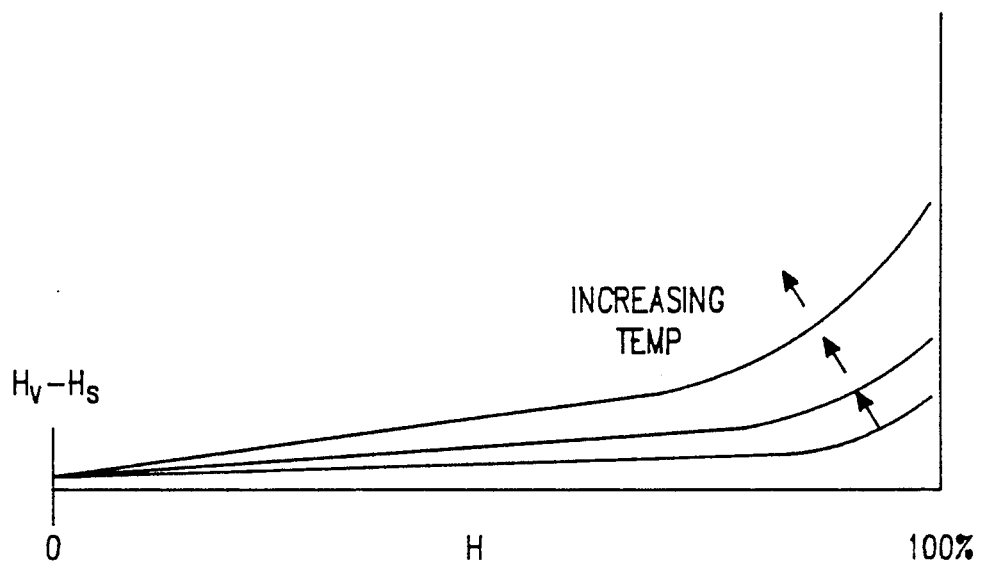
FIG. 1 is a graph illustrating the difference between the level of fluid in the vessel $H_v$ and the level of fluid in the standpipe $H_s$ as a function of the height H between the taps.

The construction and operation of the present invention will be described in conjunction with a boiler 10 illustrated in FIG. 2. The reader should understand that the principles of the present invention are applicable to a wide variety of tanks, reactor vessels, and the like and can also be applied to measuring fluid in reservoirs, rivers, dams, channels and the like such that the present invention is not limited to boilers. Therefore, the boiler 10 will be referred to by the generic term vessel, which has some bounding limit to the fluid whose height or elevation head is to be measured.

The vessel 10 has an upper tap 12 separated a distance H from a lower tap 14. The vessel 10 is equipped with a standpipe 16 which is in fluid communication with the upper tap 12 through a valve 18 and is in fluid communication with the lower tap 14 through a valve 20.

It is desirable to know the fluid level $H_v$ in the boiler 10 at all times and particularly when heat is being added to the boiler. It should be noted that the fluid level $H_v$ describes a collapsed level which is an engineering acknowledgment of bubbles in the vessel further expanding the liquid surface to a level 22 beyond the dimension $H_v$ which is representative of the weight/density and hydrostatic head which would exist if no heat was being input to the vessel.

The standpipe 16 is fitted with an ultrasonic transducer 24. Ultrasonic signals are produced by the transducer in the standpipe 16, which acts as a waveguide. The ultrasonic signals are reflected from a reference target 26 formed by a step in the waveguide's diameter or a similar reflecting discontinuity within the waveguide such as a hole formed by a tee connection. The reference target is a known distance from the transducer 24. The ultrasonic signals are also reflected from a surface 28 of the fluid in the standpipe.

A processor circuit 29 is responsive to the signals produced by the transducer 24 such that it measures a first transit time $t_1$ representative of the time for the ultrasonic signal to travel from the transducer 24 to the target 26 and back to the transducer 24, and a second transit time $t_2$ representative of the time for the ultrasonic signal to travel from the transducer 24 to the fluid surface 28 and back to the transducer 24. As will be described in greater detail in conjunction with FIG. 3, the fluid height $H_s$ can be calculated from the ratio of the two transit times. The density $\rho_s$ of the fluid in the standpipe 16 can be determined from the first transit time $t_1$ such that the calculated height $H_s$ can normalized, i.e. expressed in standard engineering units such as inches of water, feet of water, pounds per square inch differential, etc.

Figure 3:
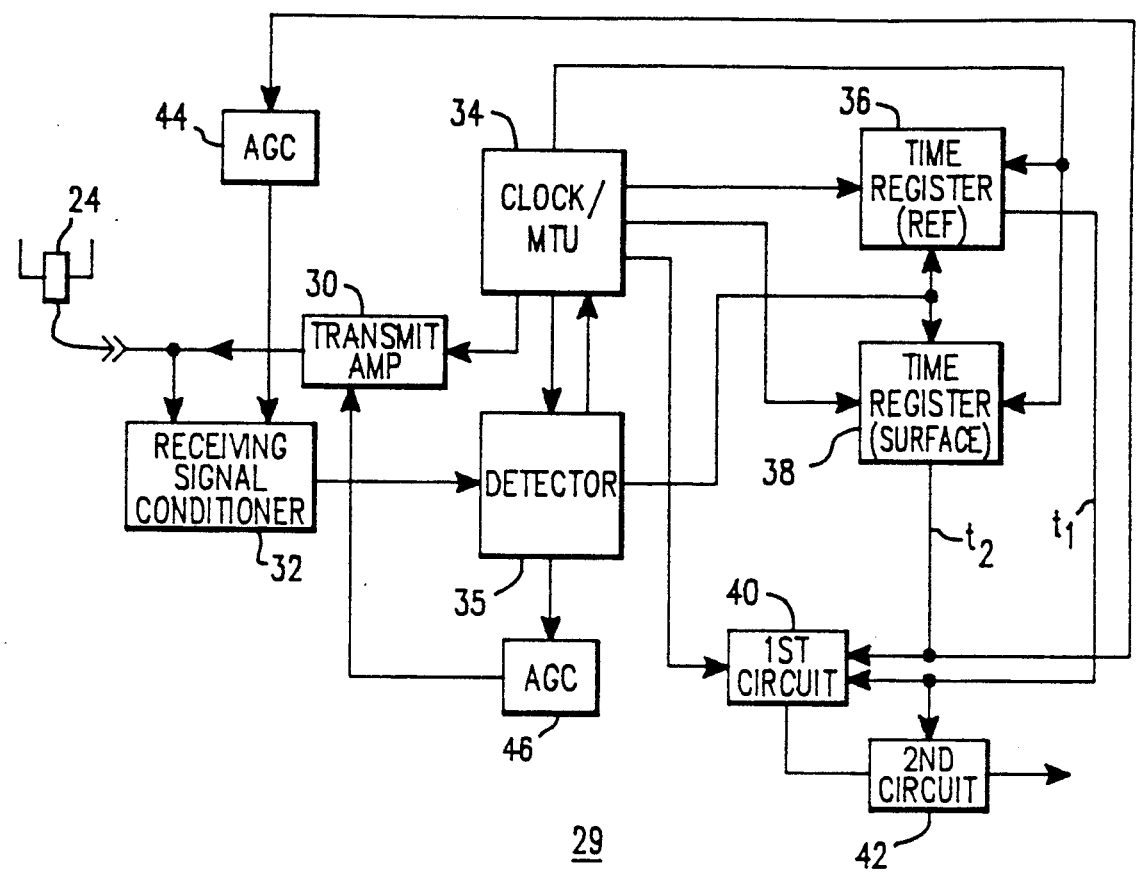
FIG. 3 is a block diagram of a temperature compensated liquid level measurement system constructed according to the teachings of the present invention.

In FIG. 3, the processor circuit 29 is shown in greater detail. The transducer 24 is in electrical communication with a transmitting amplifier (or pulse generator) 30 and a signal conditioning receiver 32. The amplifier 30 is responsive to a clock/master timing unit (MTU) 34 which regulates the production of the ultrasonic signals. Signals received by the receiving signal conditioner 32, which are representative of the reflected ultrasonic signals, are input to a detector 35.

The detector 35 initiates a first time register (counter) 36 and a second time register (counter) 38 when instructed by the MTU 34 that the an ultrasonic signal has been produced. The counters count clock pulses produced by the MTU 34. When the detector 35 receives a signal representative of the ultrasonic signal that was reflected by the target 26 shown in FIG. 2, the first counter 36 is instructed to stop counting. When the detector 35 receives a signal representative of the ultrasonic signal that was reflected by the surface of the fluid 28 in the standpipe shown in FIG. 2, the second counter 38 is instructed to stop counting. In that manner, the first counter 36 contains the value $t_1$ representative of the round trip transit time between the transducer 24 and the target 26 while the second counter 38 contains the value $t_2$ representative of the round trip transit time between the transducer 24 and the surface of the fluid 28. The MTU 34 receives a signal from the detector 35 which indicates that the counters 36 and 38 contain the necessary transit times.

The MTU instructs a first circuit 40 to receive the first transit time $t_1$ and the second transit time $t_2$. Thereafter, the MTU resets the counters 36 and 38. The second transit time $t_2$ is also input to an automatic gain control circuit 44 which controls the gain of the receiving signal conditioner 32. The detector 35 produces a signal which is input to an automatic gain control circuit 46 which controls the gain of the transmitting amplifier 30. Automatic gain control circuitry is well known for such applications.

The first circuit 40 calculates the height $H_s$ from the following equation:

$$H_s = (t_2/t_1)H_r$$

where $H_r$ is the known distance from the sensor 24 to the reference target 26. The calculated value $H_s$ and the first transit time are input to a second circuit 42.

Figure 4:
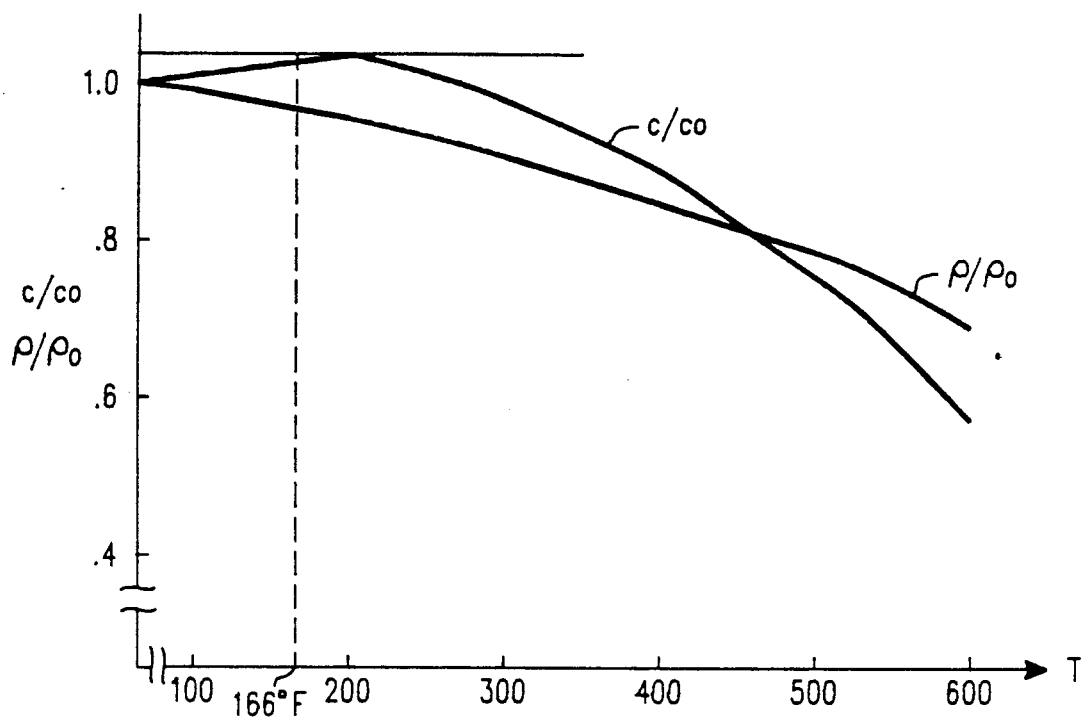
FIG. 4 is a graph illustrating density and sound velocity as a function of temperature.

One function of the second circuit 42 is to determine the density of the fluid in the standpipe from the first transit time $t_1$. It is known that both density and sound velocity are related to temperature. FIG. 4 illustrates the relationship of normalized velocity $c/c_o$, which is the measured velocity divided by the velocity at room temperature (e.g. 1,500 m/s), and the normalized density $\rho/\rho_o$, which is the measured density divided by the density at room temperature (e.g. 1,000 kg/m$^3$), for water as a function of temperature. The second circuit 42 may include a storage device for storing a table containing the same information as that represented by the curves in FIG. 4. Accordingly, the second circuit 42 divides the quantity $(H_r/t_1)$ by $c_o$ and the result is used to look up the normalized density value $\rho/\rho_o$ corresponding to that normalized velocity. The normalized density is multiplied by $\rho_o$ to yield the density of the water in the standpipe. Of course, the table stored in the second circuit 42 must be appropriate for the type of fluid in the standpipe.

One assumption needs to be made in determining the density of the fluid when water is the fluid. As can be seen from FIG. 4, the normalized velocity curve peaks at 166° F. (74.4° C.). Thereafter, the curve drops off asymmetrically. To determine the density, it is necessary to know on which side of the peak you are operating, i.e. above or below 166° F. (74.4° C.). An appropriate assumption can be made by the process engineer based on knowledge of the vessel being monitored. When the vessel is a boiler, it can be assumed that the temperature is above the boiling point so that density is calculated on the basis of that portion of the curve to the right of the peak value, i.e. where temperature is equal to or greater than 166° F. (74.4° C.). The use of fins and insulation is described hereinbelow to assure operation at the higher temperature.

Another way to determine which portion of the curve is appropriate is for the MTU 34 to act as a calendar clock storing such information as shutdown and start-up dates so that the appropriate portion of the curve is used during shutdown or operation.

Figure 5:
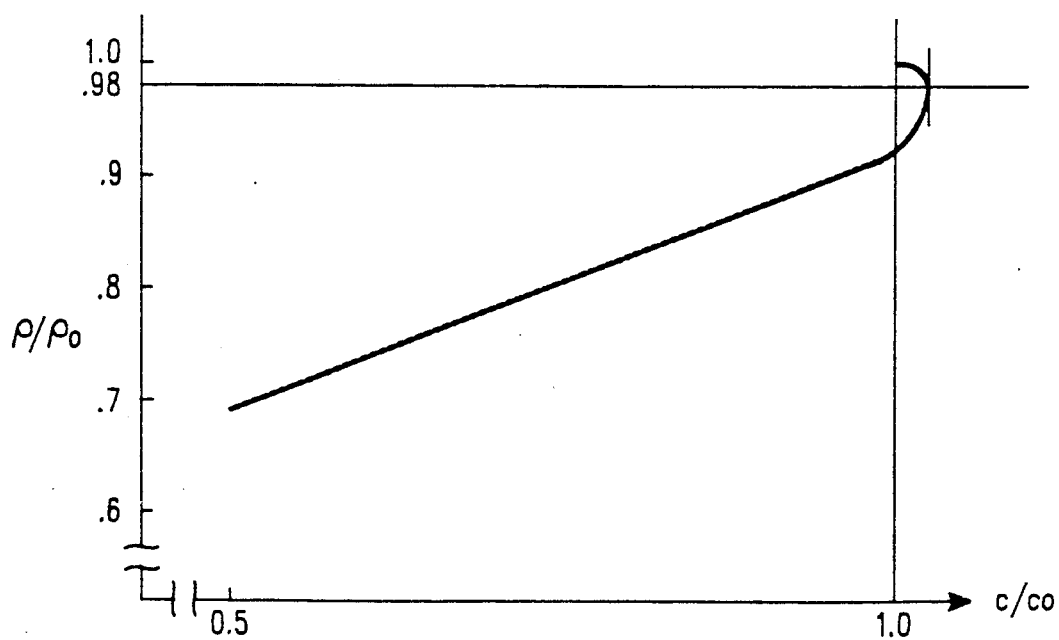
FIG. 5 is a graph illustrating density as a function of sound velocity.

The normalized density can be plotted as a function of the normalized sound velocity which results in the curve of FIG. 5, which is not drawn to scale. The circuit 42 may contain a memory device which stores the information presented in FIG. 5 in the form of a table such that the normalized density can be selected from the table based on the normalized sound velocity. The density can be determined from the normalized density as discussed above.

Those of ordinary skill in the art will recognize that the curves shown in FIGS. 4 and 5 can be represented by an equation which expresses density as a function of sound velocity. Thus, the circuit 42 may contain a memory device which stores the equation. The second circuit 42 then evaluates that equation to determine the density of the fluid in the standpipe.

After the density of the fluid in the standpipe is determined, the calculated height $H_s$ is normalized by expressing the height in inches of water at a standard reference temperature, i.e. 69° F. (20.6° C.). That can be accomplished by multiplying $H_s$ by $\rho/\rho_o$ where $\rho_o$ is the density at the reference temperature. The resulting value, the elevation head, can then be expressed in other units by the use of known conversion factors.

The normalized height output by the second circuit 42 is indicative of the height of the fluid in the vessel. The normalized height also provides the operator with an indication of the weight of the fluid above the lower tap 14.

Figure 2:
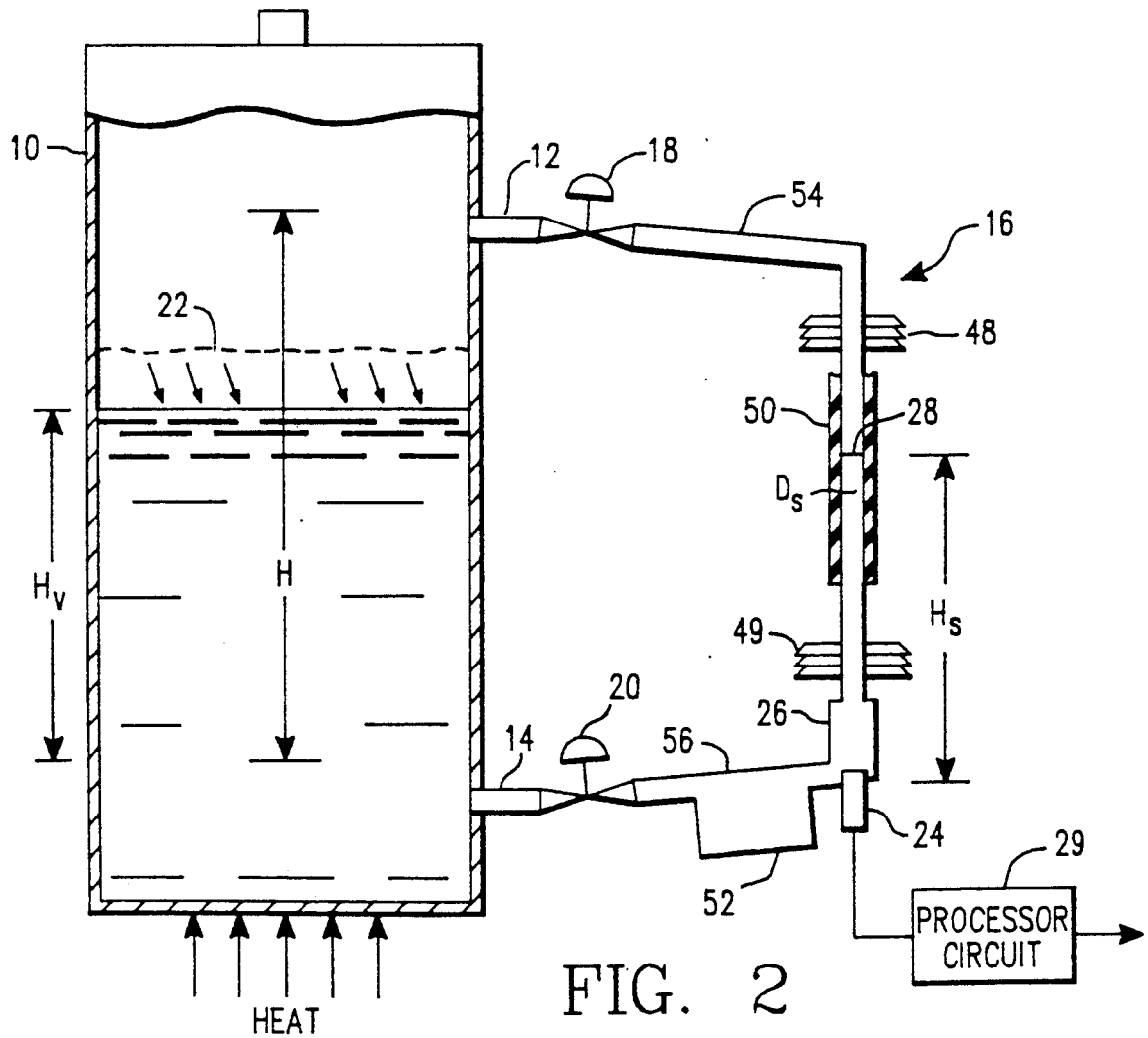
FIG. 2 illustrates a boiler having a temperature compensated liquid level measurement apparatus constructed according to the teachings of the present invention.

Those of ordinary skill in the art will recognize that the functions of the processor circuit 29 of FIG. 2, with the exception of the transmitting and receiving functions, can be easily carried out by programming a microprocessor according to well known programming techniques.

Returning to FIG. 2, owing to the orders of magnitude increase in heat transfer of condensing vapor in the vapor zone as opposed to convection or conduction in the liquid region, the standpipe 16 may be tailored to help maintain a desired relationship between the density of the fluid in the standpipe and the density of the fluid in the vessel 10. (Alternatively, the upper tap 12 of the vessel 10 may be positioned significantly higher than the desired measurement span such that the resultant density deviation is acceptable.) Such tailoring may include upper fins 48 to increase condensation thereby increasing standpipe fluid temperature at higher vessel levels, lower fins 49 to assure that acceptable subcooling exists for low vessel levels, insulation, and a reservoir 52 of subcooled fluid to assure subcooled standpipe conditions during transient increases in vessel fluid level. The standpipe 16 may have an upper portion 54 which slopes away from the vessel 10 to float out non-condensable gases to the vessel and a lower portion 56 which slopes towards the vessel to provide a flushing clean-out flow within the lower tap 14.

The tailoring of the standpipe 16 as described yields the following results: a desired high temperature for the standpipe fluid; a desired uniformity of temperature with changing level; relative immunity to rapid changes in temperature under transient level change conditions; and avoiding large differences between standpipe level and vessel level at high fluid levels.

Figure 6:
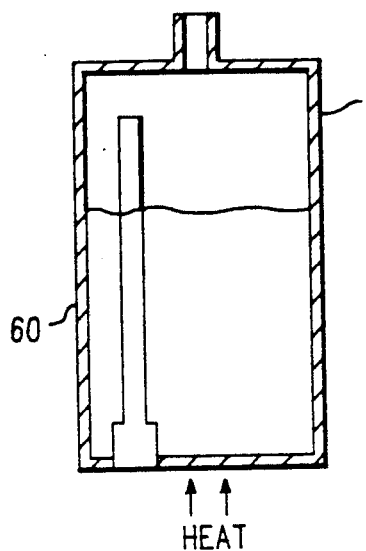
FIG. 6 illustrates a boiler having an internal standpipe.

The apparatus of the present invention can be used in conjunction with a wide variety of vessels. For example, the present invention can be used on a boiler 58 having an internal waveguide 60 as shown in FIG. 6.

The positioning of the transducer 24 in the bottom of the standpipe 16 may suffer from the following problems:

1. Sediment collecting at the bottom of the standpipe 16 will interfere with sound propagation;

2. Reverberation (ringing) in the transducer 24 and the bottom plate of the waveguide 16 (which acts as the acoustic window) may interfere with reception of a reflected signal for an excessive time and, hence, limit the minimum level that can be measured; and 3. If two transducers (one for transmitting, one for receiving) are used to reduce reverberation effects, it would be difficult to mount both on the end of the standpipe 16. Also, some window reverberation would be common to both transducers.

Figure 7:
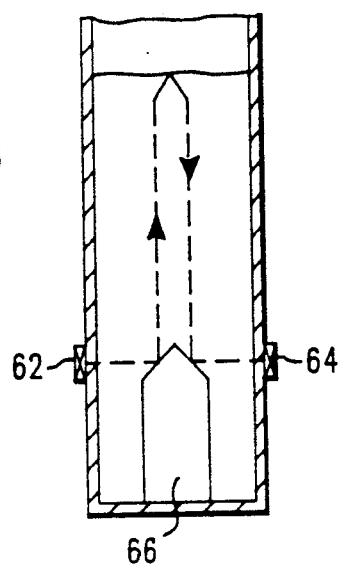

A reflective path as shown in FIG. 7 can avoid the sediment problem. Using a transmitting transducer 62 mounted across from a receiving transducer 64 on opposite sides of the standpipe 16 can avoid the second and third problems. A double forty-five degree deflector or reflector 66 is positioned therebetween to provide a signal path as shown by the broken line. A single side-mounted transducer and a single forty-five degree reflector can also be used, with the transducer acting as both transmitter and receiver.

Figure 8:
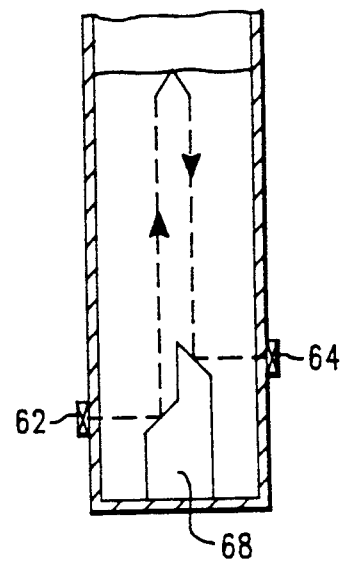

Propagation of acoustic energy within the metal standpipe walls (but not through the liquid) could be a problem as it is in any application involving ultrasonic propagation across a pipe. However, reflected signals in the liquid may arrive much later and will thus be more easily detectable in the presence of reduced wall-borne sound. To further avoid the wall-borne sound problems, transducers could be offset axially as shown in FIG. 8. In FIG. 8, an offset double forty-five degree reflector 68 is used which reduces cross-coupling between the transmitting transducer 62 and the receiving transducer 64.

Figure 9:
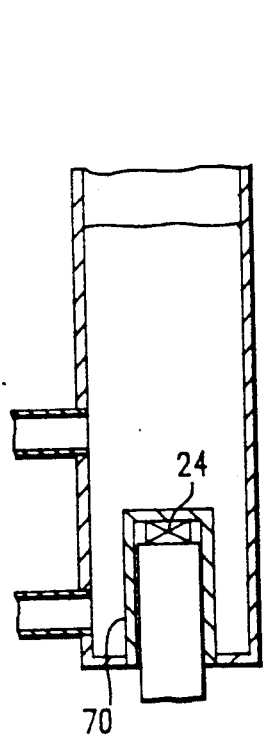

FIG. 9 shows a method of avoiding the sediment accumulation problem when the transducer 24 is mounted at the lower end and aimed axially. It consists of a well-type housing 70 (similar to a thermocouple well) which protrudes into the standpipe creating an annular region around the transducer for accumulation of sediment. Another feature of that arrangement is that the lower portion can be made larger in diameter than the main portion of the standpipe as might be necessary to provide space for the transducer. The step in inside diameters can be used as the reference target needed to compensate for sound velocity changes. Two alternative locations of the bottom tap are shown, the upper one assuring that the transducer remains covered by fluid and hence cooled, and the lower one providing more complete draining and sediment removal, which is also aided by the sloped portion 56 as mentioned.

In all arrangements intended for high temperature use, the preferred transducer design is the dry-coupled design in which good acoustic coupling is effected by means of extremely flat surfaces on mating parts and the use of a moderate coupling force. Flatness requirements are more demanding for high frequency and for shock excited pulse propagation in comparison to lower frequencies and tone burst signals. Either type of signal can be used for liquid level measurement. Even if temperatures are not extreme, that design has the advantage of easy replaceability because no bonds or liquid couplers are used.

Sound propagation inside a liquid filled tube involves waveguide modes, which may cause signals to go through cycles of increase or decrease as liquid level changes in one direction. The use of a non-circular cross-section may be useful for smoothing out such variations. For example, a flattened tube has two major lateral dimensions which should break up strong modes based on one lateral dimension. Tapering the tube could also help in that regard.

Figure 10:
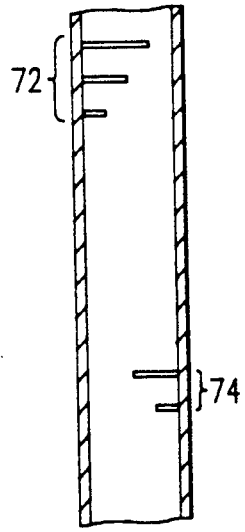

Multiple reference targets 72 and 74, as shown in FIG. 10, each produce a different reflection pattern. Reference target 74 would produce two discrete echoes and reference target 72 would produce three. Multiple targets can be used to compensate for sound velocity gradients along the standpipe length.

Figure 11:
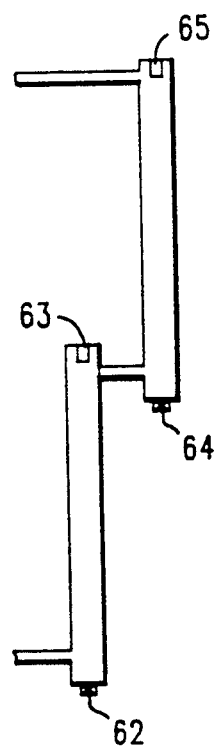

A multi-stage continuous level measurement as shown in FIG. 11 is another arrangement that has advantages, particularly if a large range of levels must be measured. With that arrangement, level would be measured in the lowest section by a first transducer 62 until the level reached the top of the lower section. As level increased further, liquid would be measured in the second section using a second transducer 64. The fact that the second transducer 64 senses liquid will act as a definite indication that the level has reached that point. In other words, it could act as a point level detector for checking the system. The reflection from the top of the lowest section would provide an accurate measurement of temperature averaged over that section when the level is in the upper section. The multi-stage arrangement requires more than one transducer but has the possible advantage of modular construction in which the required number of sections would be combined to cover the desired range. Items 63 and 65 could be retro-reflectors or active transducers operating in a transponder mode to provide a definite indication that liquid has reached the top of a given section.

Figure 12:
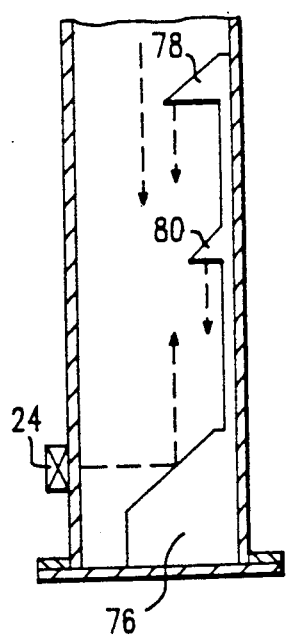

FIG. 12 shows an assembly consisting of a reflector 76 and targets 78 and 80 mounted on a bottom flange which can be inserted as a unit.

Figure 13:
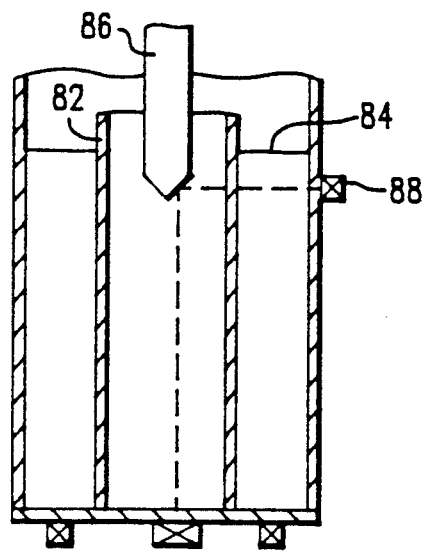
FIGS. 7-13 illustrate various transducer, reflector, and standpipe configurations.

Another embodiment shown in FIG. 13 has a center tube 82 surrounded by an annular region 84 with the annular region 84 having the liquid whose level is being measured. The center region contains a fixed amount of liquid and has adequate space for liquid expansion over the known temperature range. That construction will provide a good thermal coupling from the measured liquid to the liquid inside. A series of point level measurements can be made by providing a reflector assembly 86 inside the center tube 82 with individual reflective surfaces opposite receiving transducers 88 mounted on the outside of the outer pipe. When the level in the annulus 84 reaches the height of a given reflective surface, sound waves will travel through the annulus to the corresponding external transducer thereby providing a definite indication of level, a check on the continuous measurement, and a measure of sound velocity.

The present invention is also directed to a method for measuring the height of a fluid in a vessel, comprising the steps of: providing a waveguide in fluid communication with the vessel; positioning a reference target within the waveguide; producing ultrasonic signals; measuring a first transit time representative of the time for the ultrasonic signals to travel to and from the target; measuring a second transit time representative of the time for the ultrasonic signals to travel to and from the surface of a fluid in the waveguide; calculating the height of the fluid in the waveguide from the first and second transit times; determining the density of the fluid in the waveguide from the first transit time; and normalizing the calculated height of the fluid based on the density of the fluid such that the normalized height is indicative of the height of the fluid in the vessel.

While the present invention has been described in conjunction with a preferred embodiment thereof, many modifications and variations will be apparent to those of ordinary skill in the art. This disclosure and the following claims are intended to cover all such modifications and variations.

What we claim is:

1. A system for providing a temperature compensated measurement indicative of the elevation head of a fluid having a measurable density in a vessel, comprising:
   an acoustic waveguide in fluid communication with the vessel;
   a reference target positioned within said waveguide;
   ultrasonic transducer means for producing ultrasonic signals in the fluid;
   timing means for measuring a first transit time representative of the time for said ultrasonic signals to travel to and from said target and for measuring a second transit time representative of the time for said ultrasonic signals to travel to and from a surface of a fluid in said waveguide;

means for calculating the height of the fluid in said waveguide from said first and second transit times; and means for determining the density of the fluid in said waveguide from said first transit time, for normalizing the determined density, and for multiplying the calculated height of the fluid by the normalized density of the fluid to provide an indication of the elevation head of the fluid in the vessel.

2. The system of claim 1 wherein said waveguide is located inside said vessel.

3. The system of claim 1 additionally comprising detector means responsive to said ultrasonic transducer for detecting the ultrasonic signals reflected by said target and the fluid surface, said timing means being responsive to said detector means.

4. The system of claim 1 wherein said means for calculating the height of the fluid calculates the height based on a ratio of the first and second transit times.

5. The system of claim 1 wherein said ultrasonic transducer means includes a transducer for transmitting and receiving said ultrasonic signals.

6. The system of claim 1 wherein said ultrasonic transducer means includes a transmitting transducer and a receiving transducer.

7. The system of claim 1 additionally comprising a housing and wherein said transducer means is mounted within said housing.

8. The system of claim 1 additionally comprising a plurality of reference targets.

9. A system for providing a temperature compensated measurement indicative of the elevation head of a fluid having a measurable density in a vessel, comprising:

an acoustic waveguide in fluid communication with the vessel;

a reference target positioned within said waveguide;

ultrasonic transducer means for producing ultrasonic signals in the fluid;

timing means for measuring a first transit time representative of the time for said ultrasonic signals to travel to and from said target and for measuring a second transit time representative of the time for said ultrasonic signals to travel to and from a surface of a fluid in said waveguide;

means for calculating the height of the fluid in said waveguide from said first and second transit times; and means for determining the density of the fluid in said waveguide, said means for determining including means for dividing the distance to said reference target by the first transit time to obtain the velocity of the ultrasonic signals, and means for determining the density of the fluid based on said velocity;

means for normalizing the determined density; and means for multiplying the calculated height of the fluid by the normalized density of the fluid to provide an indication of the elevation head of the fluid in the vessel.

10. The system of claim 9 additionally comprising a calendar clock for determining if the temperature is above approximately 166° F., and wherein said means for determining the density of the fluid is responsive to said calendar clock.

11. The system of claim 9 wherein said means for normalizing said calculated height of the fluid includes means for expressing said calculated height in terms of standard engineering units.

12. The system of claim 9 wherein said means for determining the density of the fluid includes means for evaluating an equation which expresses density as a function of velocity.

13. The system of claim 9 additionally comprising storage means containing a table, and wherein said means for determining the density of the fluid includes means for selecting a valve from said table.

14. A system for providing a temperature compensated measurement indicative of the elevation head of a fluid having a measurable density in a vessel, comprising:

an acoustic waveguide in fluid communication with the vessel and wherein said waveguide includes means for maintaining the temperature of the fluid within said waveguide constant;

a reference target positioned within said waveguide;

ultrasonic transducer means for producing ultrasonic signals in the fluid;

timing means for measuring a first transit time representative of the time for said ultrasonic signals to travel to and from said target and for measuring a second transit time representative of the time for said ultrasonic signals to travel to and from a surface of a fluid in said waveguide;

means for calculating the height of the fluid in said waveguide from said first and second transit times; and means for determining the density of the fluid in said waveguide from said first transit time, for normalizing the determined density, and for multiplying the calculated height of the fluid by the normalized density of the fluid to provide an indication of the elevation head of the fluid in the vessel.

15. The system of claim 14 wherein said means for maintaining the temperature of the fluid within said waveguide constant includes condensation fins, insulation, and a reservoir for subcooled liquid.

16. A system for providing a temperature compensated measurement indicative of the elevation head of a fluid having a measurable density in a vessel, comprising:

an acoustic waveguide in fluid communication with the vessel;

a reference target positioned within said waveguide;

ultrasonic transducer means which includes a transmitting transducer and a receiving transducer for producing and receiving ultrasonic signals in the fluid;

a double forty-five degree reflector, said transmitting transducer and said receiving transducer each being positioned adjacent to one of said reflector's surfaces;

timing means for measuring a first transit time representative of the time for said ultrasonic signals to travel to and from said target and for measuring a second transit time representative of the time for said ultrasonic signals to travel to and from a surface of a fluid in said waveguide;

means for calculating the height of the fluid in said waveguide from said first and second transit times; and means for determining the density of the fluid in said waveguide from said first transit time, for normalizing the determined density, and for multiplying the calculated height of the fluid by the normalized density of the fluid to provide an indication of the elevation head of the fluid in the vessel.

17. A system for providing a temperature compensated measurement indicative of the elevation head of a fluid having a measurable density in a vessel, comprising:

an acoustic waveguide in fluid communication with the vessel wherein said waveguide includes a standpipe located outside of said vessel and is in fluid communication with the vessel through upper and lower taps carried by the vessel;

a reference target positioned within said waveguide;

ultrasonic transducer means for producing ultrasonic signals in the fluid;

timing means for measuring a first transit time representative of the time for said ultrasonic signals to travel to and from said target and for measuring a second transit time representative of the time for said ultrasonic signals to travel to and from a surface of a fluid in said waveguide;

means for calculating the height of the fluid in said waveguide from said first and second transit times; and means for determining the density of the fluid in said waveguide from said first transit time, for normalizing the determined density, and for multiplying the calculated height of the fluid by the normalized density of the fluid to provide an indication of the elevation head of the fluid in the vessel.

18. A system for providing a temperature compensated measurement indicative of the elevation head of a fluid having a measurable density in a vessel, comprising:

an acoustic waveguide in fluid communication with the vessel;

a reference target positioned within said waveguide;

ultrasonic transducer means for producing ultrasonic signals in the fluid;

timing means for measuring a first transit time representative of the time for said ultrasonic signals to travel to and from said target and for measuring a second transit time representative of the time for said ultrasonic signals to travel to and from a surface of a fluid in said waveguide;

detector means responsive to said ultrasonic transducer for detecting the ultrasonic signals reflected by said target and the fluid surface, said timing means being responsive to said detector means, said timing means including a clock and first and second counters, said first counter being responsive to said clock and said detector means for measuring said first transit time, said second counter being responsive to said clock and said detector means for measuring said second transit time;

means for calculating the height of the fluid in said waveguide from said first and second transit times; and means for determining the density of the fluid in said waveguide from said first transit time, for normalizing the determined density, and for multiplying the calculated height of the fluid by the normalized density of the fluid to provide an indication of the elevation head of the fluid in the vessel.

19. A system for providing a temperature compensated measurement indicative of the elevation head of a fluid having a measurable density in a vessel, comprising:

an acoustic waveguide in fluid communication with the vessel;

a reference target positioned within said waveguide;

ultrasonic transducer means for producing ultrasonic signals in the fluid;

a forty-five degree reflector, said transducer means being positioned adjacent to said reflector;

timing means for measuring a first transit time representative of the time for said ultrasonic signals to travel to and from said target and for measuring a second transit time representative of the time for said ultrasonic signals to travel to and from a surface of a fluid in said waveguide;

means for calculating the height of the fluid in said waveguide from said first and second transit times; and means for determining the density of the fluid in said waveguide from said first transit time, for normalizing the determined density, and for multiplying the calculated height of the fluid by the normalized density of the fluid to provide an indication of the elevation head of the fluid in the vessel.

20. A method for providing a temperature compensated measurement indicative of the elevation head of a fluid having a measurable density in a vessel, comprising the steps of:

providing an acoustic waveguide in fluid communication with the vessel;

positioning a reference target within said waveguide;

producing ultrasonic signals in the fluid;

measuring a first transit time representative of the time for said ultrasonic signals to travel to and from said target;

measuring a second transit time representative of the time for said ultrasonic signals to travel to and from the surface of a fluid in said waveguide;

calculating the height of the fluid in said waveguide from said first and second transit times;

determining the density of a fluid in said waveguide from said first transit time;

normalizing the determined density; and multiplying the calculated height of the fluid by the normalized density of the fluid to provide an indication of the elevation head of the fluid in the vessel.

21. A method for providing a temperature compensated measurement indicative of the elevation head of a fluid having a measurable density in a vessel, comprising the steps of:

providing an acoustic waveguide in fluid communication with the vessel;

positioning a reference target within said waveguide producing ultrasonic signals in the fluid;

measuring a first transit time representative of the time for said ultrasonic signals to travel to and from said target;

measuring a second transit time representative of the time for said ultrasonic signals to travel to and from a surface of a fluid in said waveguide;

calculating the height of the fluid in said waveguide which includes the step of elevating an equation which expresses the height of the fluid as a function of the first and second transit times and the known distance to the reference target;

determining the density of the fluid in said waveguide from said first transit time;

normalizing the determined density; and multiplying the calculated height of the fluid by the normalized density of the fluid to provide an indication of the elevation head of the fluid in the vessel.

22. A method for providing a temperature compensated measurement indicative of the elevation of a fluid having a measurable density in a vessel, comprising the steps of:

provinding an acoustic waveguide in fluid communication with the vessel;

positioning a reference target within said waveguide;

producing ultrasonic signals in the fluid;

measuring a first transit time representative of the time for said ultrasonic signals to travel to and from said target;

measuring a second transit time representative of the time for said ultrasonic signals to travel to and from the surface of a fluid in said waveguide;

calculating the height of the fluid in said waveguide from said first and second transit times;

determining the density of the fluid in said waveguide from said first transit time;

normalizing the determined density; and multiplying the calculated height of the fluid by the normalized density of the fluid to express the calculated height in standard engineering units to provide an indication of the elevation head of the fluid in the vessel.

* * * * *